(12) United States Patent
Torem

(10) Patent No.: US 10,778,020 B1
(45) Date of Patent: Sep. 15, 2020

(54) MULTIPORT PORTABLE POWER BANK

(71) Applicant: Michael K. Torem, Columbus, OH (US)

(72) Inventor: Michael K. Torem, Columbus, OH (US)

( * ) Notice: Subject to any disclaimer, the term of this patent is extended or adjusted under 35 U.S.C. 154(b) by 129 days.

(21) Appl. No.: 16/208,619

(22) Filed: Dec. 4, 2018

(51) Int. Cl.
*H02J 7/00* (2006.01)
*H01R 31/06* (2006.01)

(52) U.S. Cl.
CPC .......... *H02J 7/0044* (2013.01); *H01R 31/065* (2013.01); *H02J 7/0013* (2013.01); *H02J 7/0042* (2013.01); *H02J 7/00* (2013.01); *H02J 2207/40* (2020.01)

(58) Field of Classification Search
CPC ...... H02J 7/0013; H02J 7/0042; H02J 7/0044; H02J 2007/30; H02J 2007/40
USPC .......................................... 320/107, 144, 114
See application file for complete search history.

(56) References Cited

U.S. PATENT DOCUMENTS

| 9,153,986 | B1 | 10/2015 | Herr et al. | |
|---|---|---|---|---|
| 2012/0013291 | A1* | 1/2012 | Lahti | H02J 7/0044 320/107 |
| 2013/0043827 | A1 | 2/2013 | Weinstein et al. | |
| 2015/0015180 | A1 | 1/2015 | Miller et al. | |
| 2015/0028797 | A1 | 1/2015 | Miller et al. | |
| 2016/0322858 | A1* | 11/2016 | Miller | H02J 7/0013 |
| 2017/0093190 | A1* | 3/2017 | Miller | H02J 7/0044 |

* cited by examiner

*Primary Examiner* — Paul Dinh
(74) *Attorney, Agent, or Firm* — Gugliotta & Gugliotta, LPA

(57) ABSTRACT

A portable power bank is providing having a main first battery, a deployable AC power input plug, and at least a second battery. The first battery is removably affixed to the second battery by a mating slide connector forming an interchangeable tongue and groove connection that mechanically and electrically connects the first battery to the second battery. A plurality of output ports connected to each battery can be connected to a USB standard connector, a USB micro connector, a USB mini connectors, a full duplex USB type C connector, or a Lightning form factor connector. Such a modular system connected batteries to be recharged from a single AC plug. The multiple output ports allow for charging of more than one portable electronic device. The instant abstract is neither intended to define the invention disclosed in this specification nor intended to limit the scope of the invention in any way.

20 Claims, 20 Drawing Sheets

MULTIPORT PORTABLE POWER BANK

RELATED APPLICATIONS

There are no previously filed, nor currently any co-pending applications, anywhere in the world.

BACKGROUND OF THE INVENTION

1. Field of the Invention

This invention relates to device chargers and, more particularly, to a modular, reconfigurable portable device charging station adaptable with a variety of customizable cords and plugs.

2. Description of the Related Art

Increased use of portable electronic devices continues to rise along with the increasing capabilities of such devices. While only a few years ago a cellular telephone would provide only for ubiquitous voice communications, the current state of consumer use allows for ubiquitous computer internet availability and interaction. Portable devices are increasingly becoming the primary, and often singular phone access for consumers. Further trends indicate that such portable devices will increasingly become primary consumer access to internet (i.e., social media, etc.), telecommunications (i.e., voice, email, text message, etc.) and entertainment (i.e., television, video or music streaming services, news, etc.).

It would be reasonable to assume that such a trend would continue to increase use of such devices. Further, should any future functionality become available it would be reasonable to assume that such a trend may accelerate.

In such an environment with portable device capability increasing and their use becoming more widespread, the demand for portable electric power is ever increasing. With the balance between battery capability and portable device size/weight, the need for portable recharging is also rapidly growing. Most electronic devices specifically designed for portability and on-the-go use allow for a cable connection to either power the device or to recharge the device battery. However, such line-power recharging systems demand access to a power source, such as a wall outlet, a car charger, an airplane charger, or a computer. Further, different types of devices have a separate cable required for each power source. Further still, different electronic devices often utilize different connection ports and interfaces such that a single charging cable is not compatible with multiple devices.

Such a state creates several contemporaneous and identifiable problems or concerns, namely:

- a need for a portable charging bank that can recharge or power portable electronic devices without the need for a wall outlet, a car charger, etc.;
- a need for such charging to allow for powering or recharging multiple portable electronic devices; and
- a need to access such a portable charging bank using a number of different configurations of cable connectors.

Consequently, a need exists for a portable charging bank that is adaptable to multiple portable electronic devices using a number of different configurations of cable connectors.

SUMMARY OF THE INVENTION

It is thus an object of the present invention to provide an improved multiport portable power bank.

Features of the present invention allow for modular, reconfigurable and portable device charging stations adaptable with a variety of customizable cords and plugs.

Briefly described according to the preferred embodiment of the present invention, an improved portable power bank is provided which can charge all types of devices using a variety of customizable cords and plugs based on the needs of the individual or of a group sharing the power bank. Utilizing a modular tongue and groove design, a number of different sized charging elements may be connected to a main base unit with all the elements recharging from a single AC plug. By providing different permutations of charging elements, the system has the ability to recharge one connected element while discharging another connected element to a connected load. All cords may be interchangeable between units by having a common configuration of a proximal connector. Different cord types may also incorporate different configurations for cord distal connectors, thereby allowing for interchangeably use with charging various types of portable electronic devices. Each of the connection cords may be configured to be wrapped around and received within a retention slot formed within an element's outer housing. Such a configuration allows the proximal connector to be clipped into the side while the length of the cords may be wrapped around the front and around the right side, thereby storing in a flush recess that keeps the cord retained near the power element without becoming lost or tangled.

The improved portable power bank of the present invention provides a number of different modular elements that may be physically linked with a tongue and groove style connection. The main first element forms a female slide connector along the lower terminus. The main element incorporates a deployable AC power input plug providing electrical power to a first battery element. Three female ports are provided in electrical communication with the first battery element, including a first USB A output port, a first Type-C output port, and a first Qualcomm 3.0 Type-C input/output port usable by any Type-C cord. The first charging cord may snap and lock into the port with a magnetic clasp, a buckle clasp, a ball and socket or other similar or equivalent type of connector. A second element forms a male slide connector along the upper terminus forming the interchangeable tongue and groove connector with the main first element. The second element incorporates a second battery element in electrical communication with the first battery element. Three female ports are provided in electrical communication with the second battery element, including a second USB A output port, a second Type-C output port, and a second Qualcomm 3.0 Type-C input/output port usable by any Type-C cord.

Other third elements may be further provided, similarly configured as the second element and capable of being interchanged with the second element in connection with the first element. A plurality of such third elements may be provided. Further, the battery charging capacity may vary between the various elements.

Various other modular elements may be provided having different configurations and functions that may be connected interchangeably with the main first element. These may include a wireless charging pad, a lighting element (e.g., nightlight, flashlight, etc.), or a DC charger unit allowing any of the other elements to be charged from a car outlet. Various other non-powered accessories may further be used in conjunction with the tongue and groove connection, such as, for example, a support stand attachable to any unit by way of the slide connector to allow the system to stand upright.

Various cords may be provided interchangeable, having different connector configurations. These may include: male Type-C to male USB; male Type-C to Female USB; male Type-C to male AC plug; male Type-C to Male Type-C; male type-C to male Lightning; or male type-C to male micro USB.

Such a modular system allows for multiple charging elements to be connected and charge from a single AC plug. Multiple elements may allow for charging of more than one portable electronic device, or for recharging of any element while recharging any connected element.

Further objects, features, elements and advantages of the present invention will become readily apparent from the following detailed description of the preferred embodiment when considered with the attached drawings and the appended claims.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Figure 1:
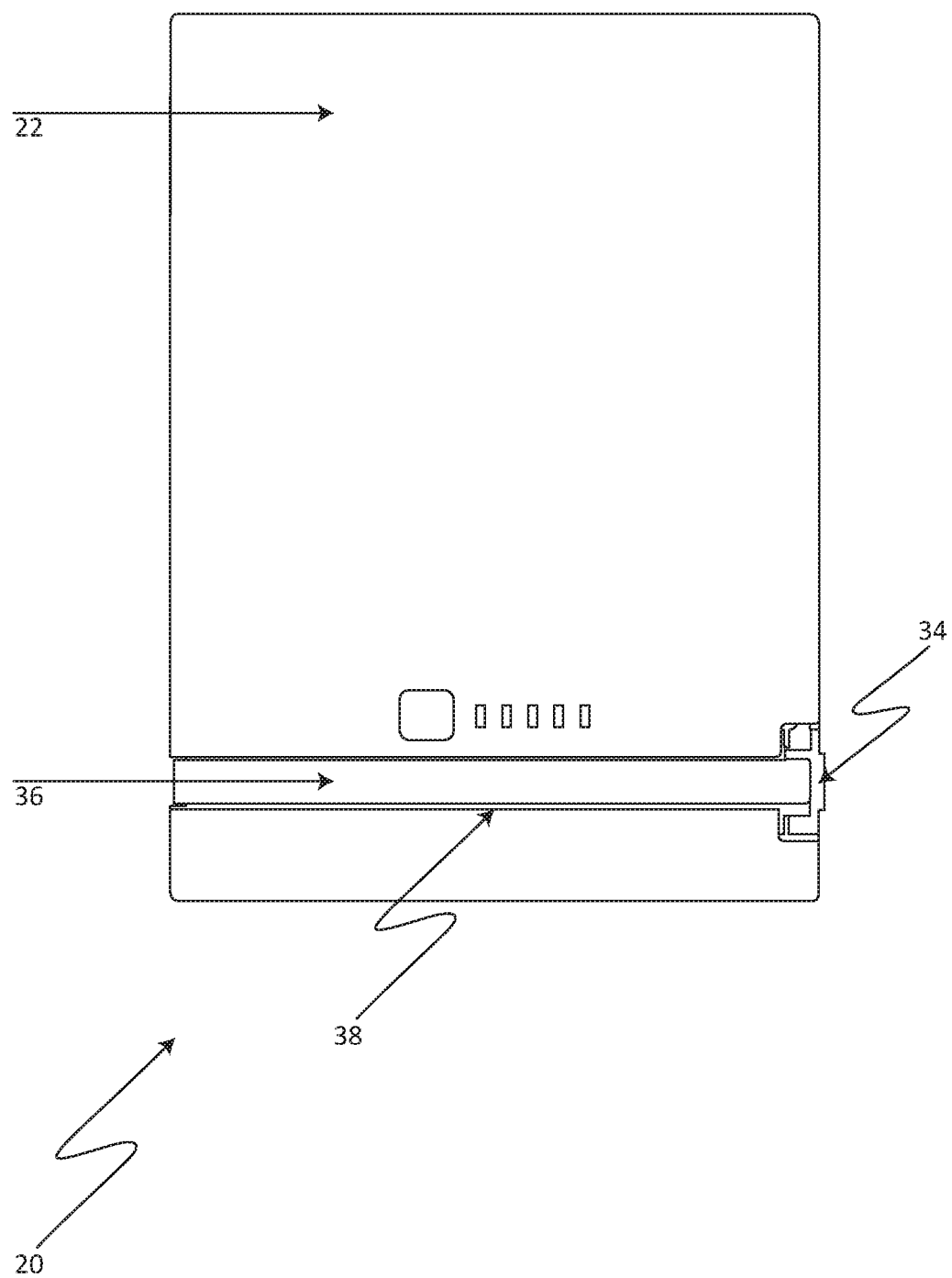
FIG. 1 is a front elevational view of a main first charging element of an improved multiport portable power bank according to a preferred embodiment of the present invention.
Figure 2:
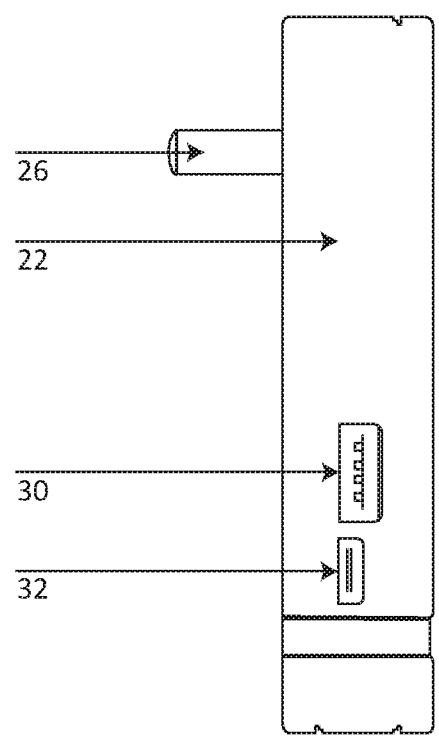
FIG. 2 is a left side elevational view thereof.
Figure 3:
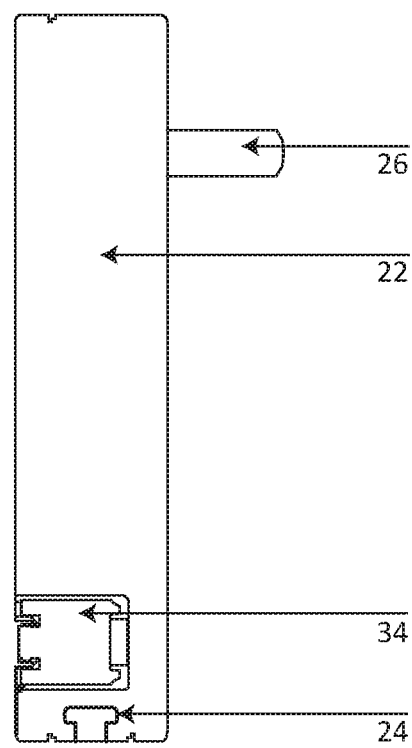
FIG. 3 is a right side elevational view thereof.
Figure 4:
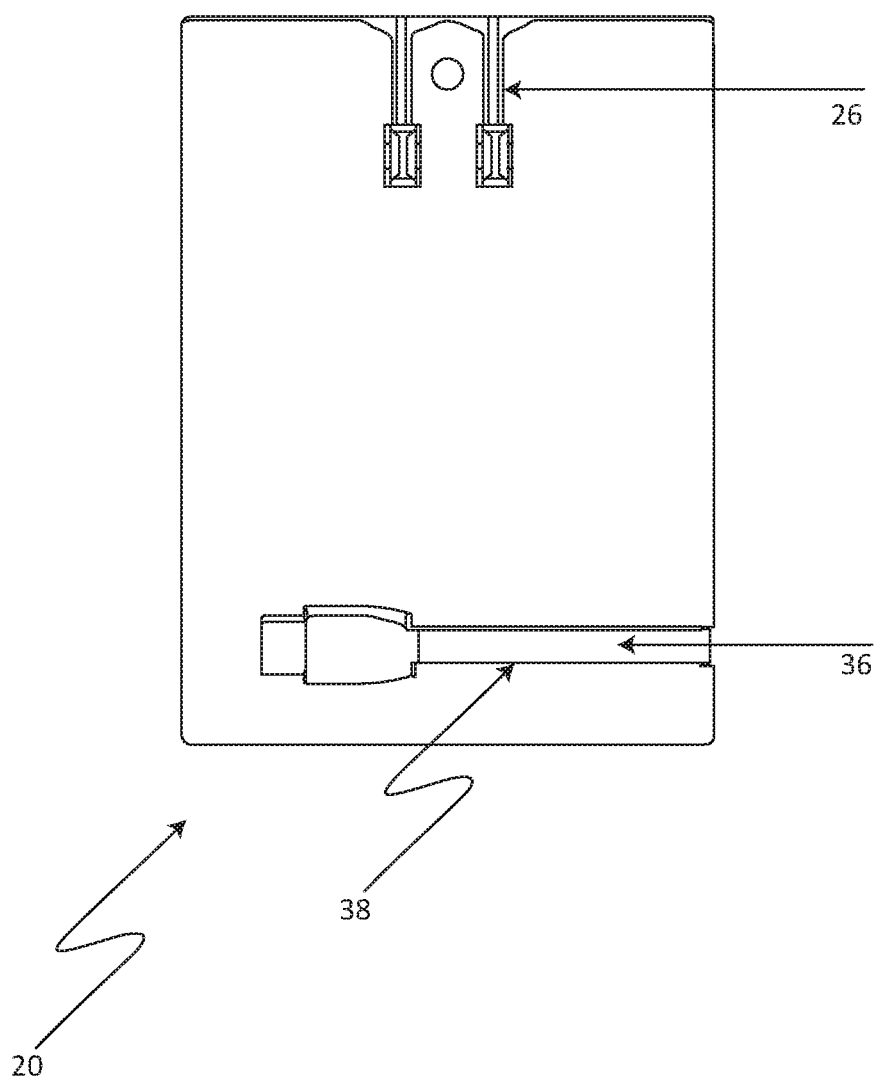
FIG. 4 is a rear elevational view thereof.
Figure 5:
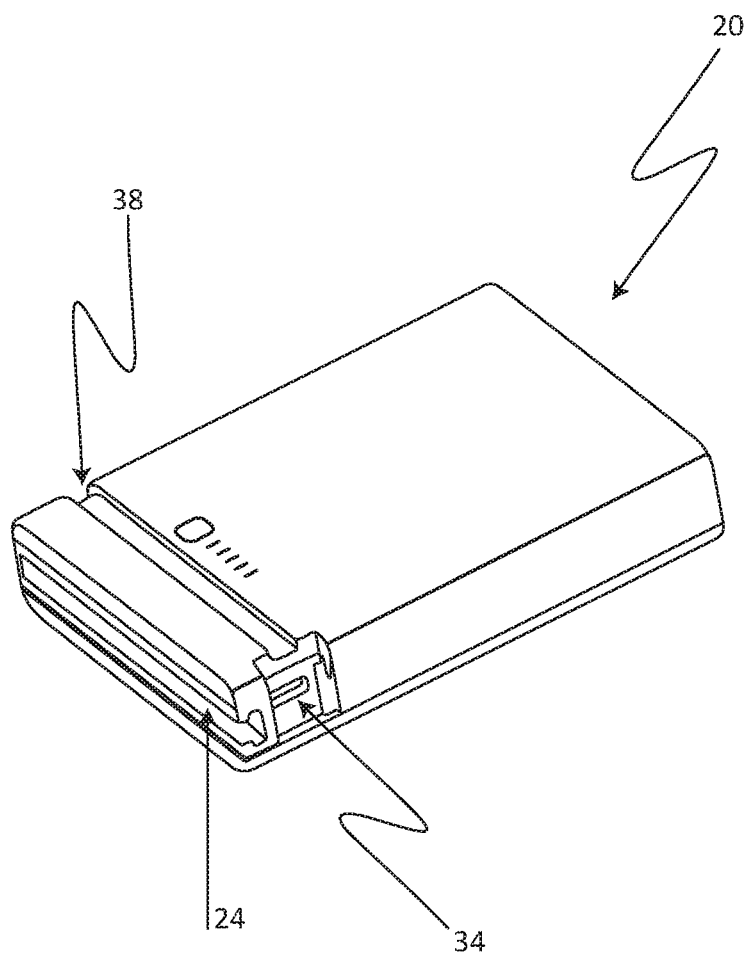
FIG. 5 is a top perspective view thereof.
Figure 6:
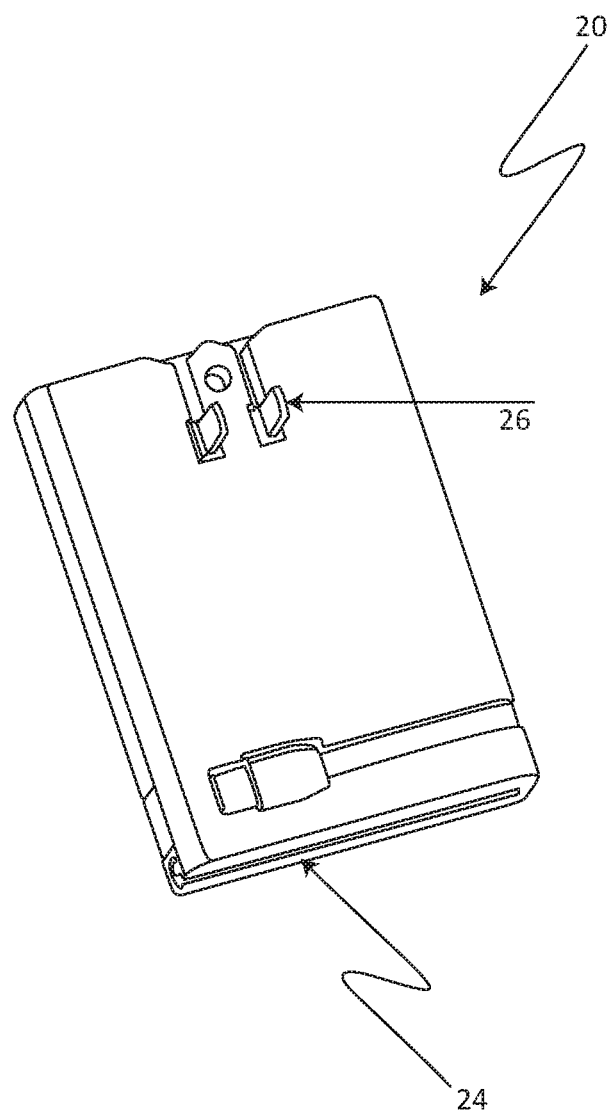
FIG. 6 is a bottom perspective view thereof.
Figure 7:
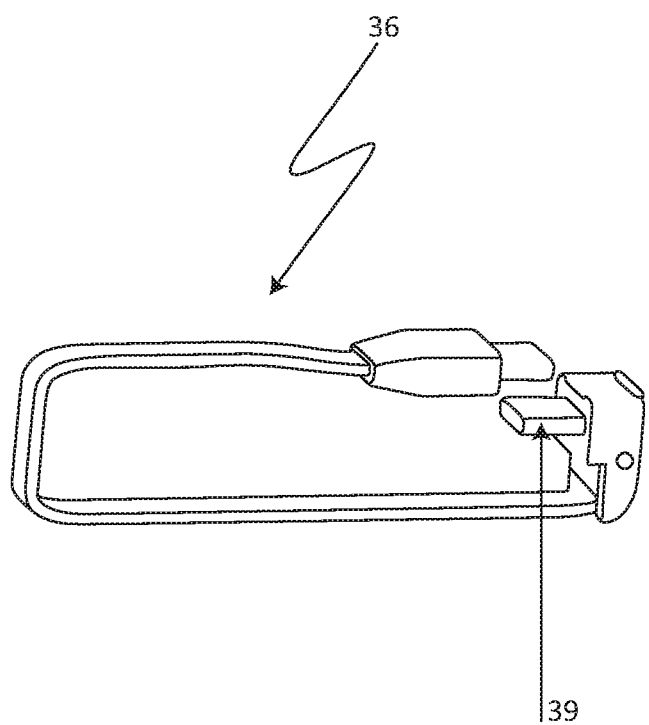
FIG. 7 is a perfective view of a first coordinating charging cord for use therewith.

Referring now to FIG. 1 through FIG. 7, an improved portable power bank according to a preferred embodiment of the present invention is provided including a main first element, generally noted as 20. Element 20 contains a first battery element 22 within a housing that forms a female slide connector 24 along the lower terminus. The first battery element 22 forms a first charging unit that is recharged via an incorporated a deployable AC power input plug 26. Along a left side of the housing are provided, in electrical communication with the first battery element 22, is formed a first USB A output port 30 and a first Type-C output port 32. Along a right side of the housing are provided a first Qualcomm 3.0 Type-C input/output port 34 usable by any Type-C cord. A first charging cord 36 may snap and lock into the port 34 with a magnetic clasp, a buckle clasp, a ball and socket or other similar or equivalent type of connector.

A retention slot 38 is formed circumscribing the housing of the first battery element 22. The slot 38 may be aligned with the port 34 such that the connection cord 36 may be configured to be wrapped around and received within a retention slot 38 when a first proximal connector 39 is affixed within port 34.

Figure 8:
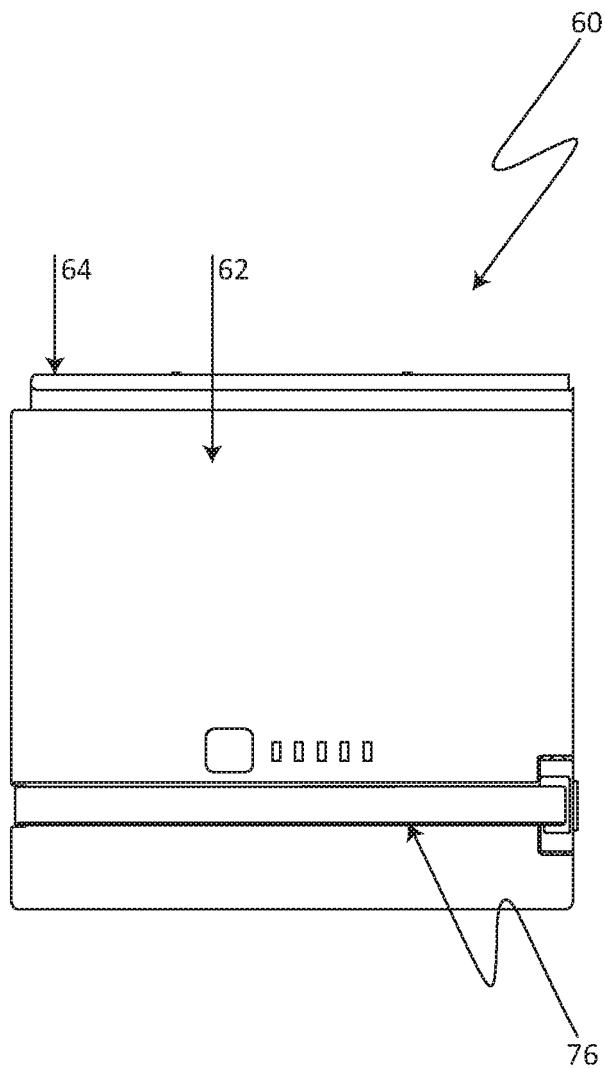
FIG. 8 is a front elevational view of a second charging element of the improved multiport portable power bank according to a preferred embodiment of the present invention.
Figure 9:
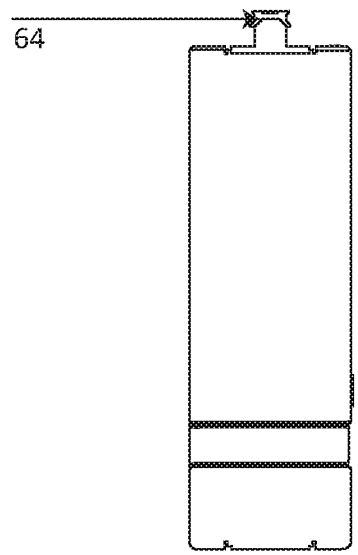
FIG. 9 is a left side elevational view thereof.
Figure 10:
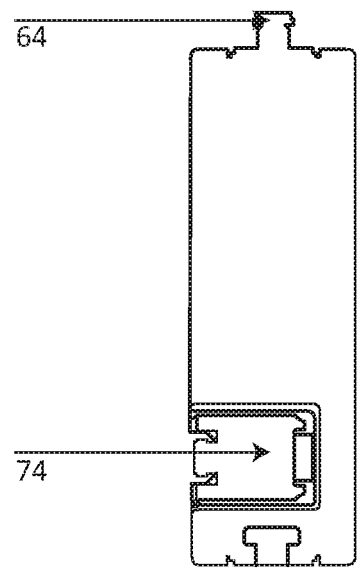
FIG. 10 is a right side elevational view thereof.
Figure 11:
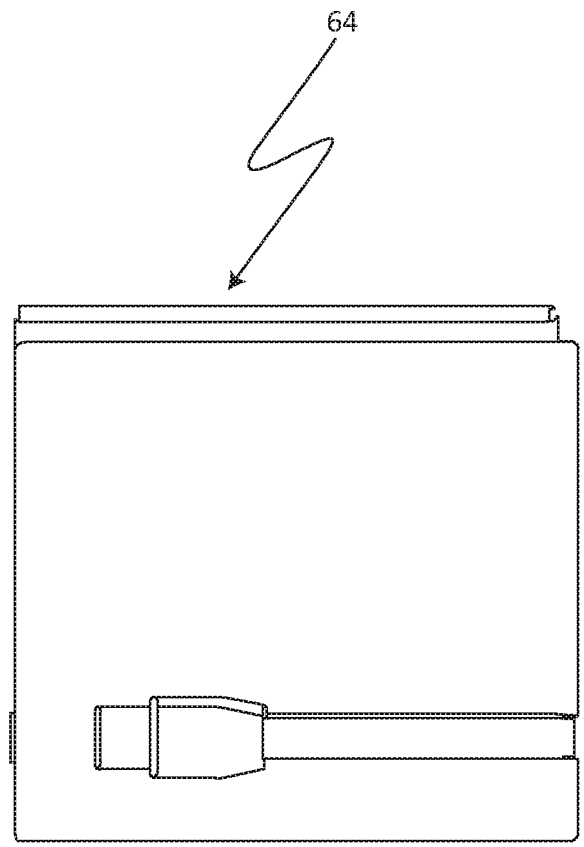
FIG. 11 is a rear elevational view thereof.
Figure 12:
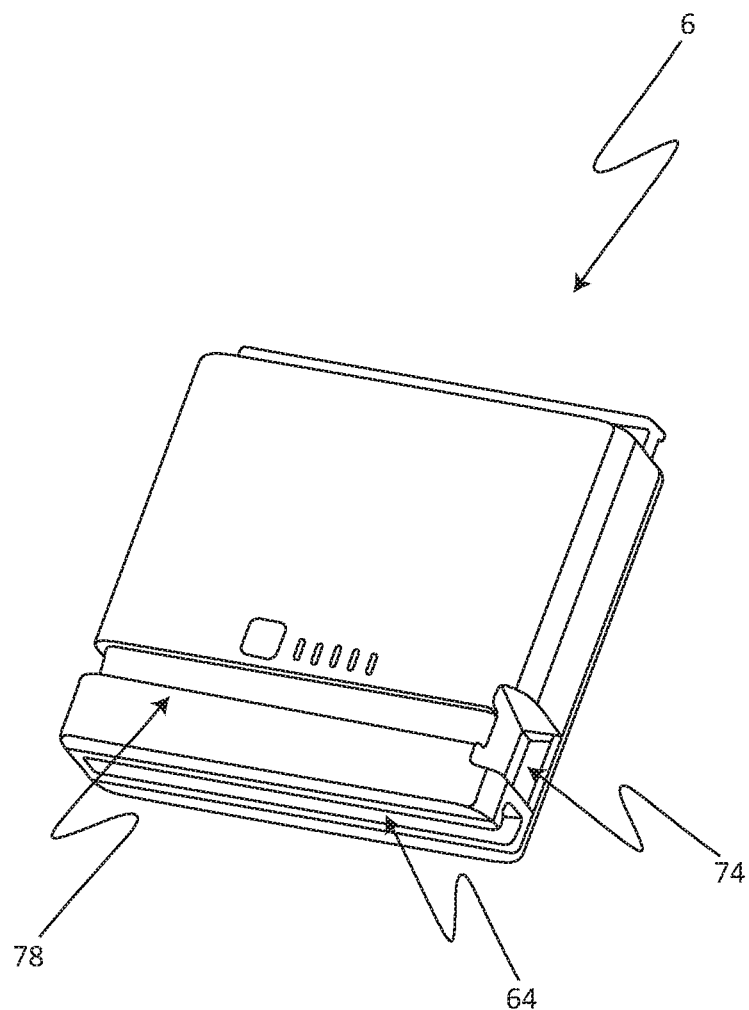
FIG. 12 is a top perspective view thereof.
Figure 13:
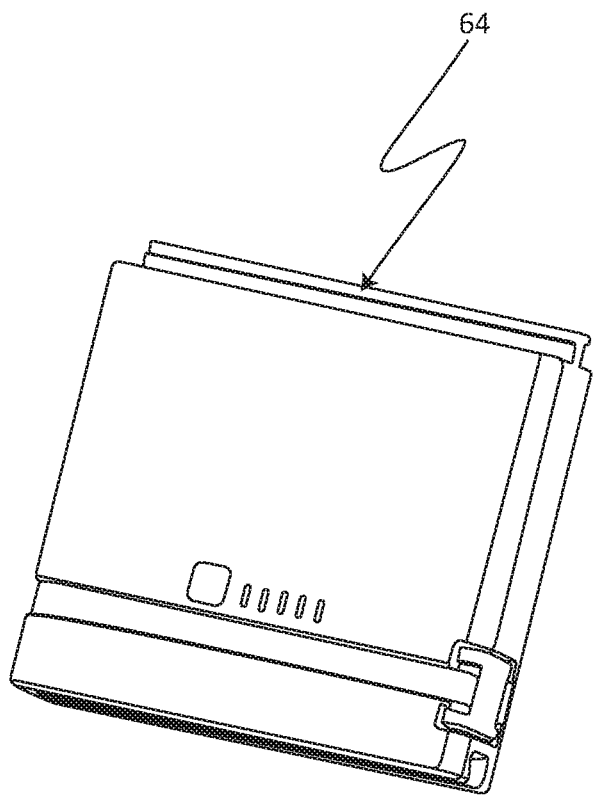
FIG. 13 is a bottom perspective view thereof.
Figure 14:
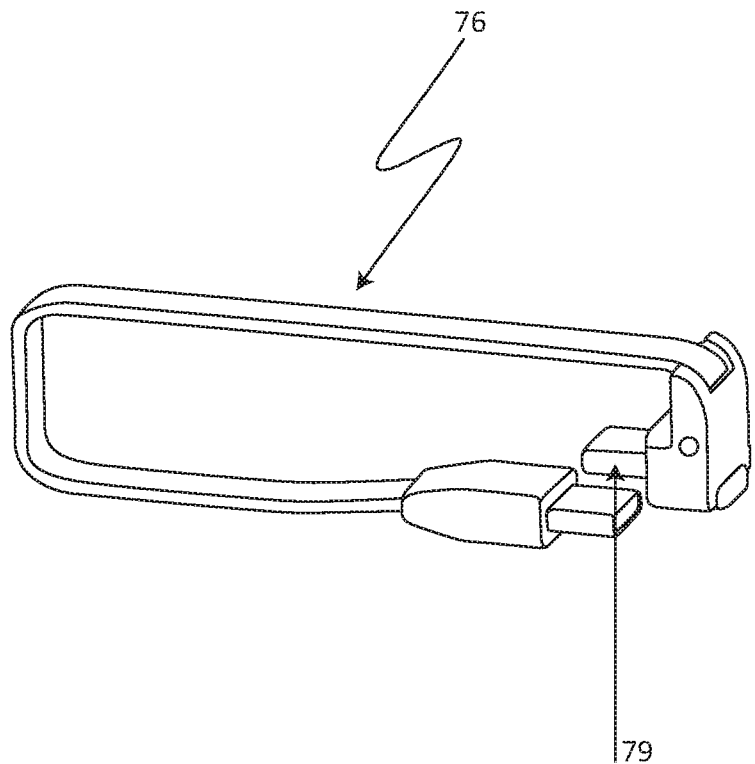
FIG. 14 is a perfective view of a second coordinating charging cord for use therewith.

Referring now to FIG. 8 through FIG. 14, the improved portable power bank according to a preferred embodiment further includes at least a second element, generally noted as 60. The second element 60 contains a second battery element 62 within a housing that forms a male slide connector 64 along the upper terminus. The second battery element 62 forms a second charging unit that is recharged via the main first element 20 when connected in a manner as described in greater detail below. Along a left side of the housing are provided, in electrical communication with the second battery element 62, is formed a second USB A output port 70 and a second type-C output port 72. Along a right side of the housing are provided a second Qualcomm 3.0 Type-C input/output port 74 usable by any type-C cord. A second charging cord 76 may snap and lock into the port 74 with a magnetic clasp, a buckle clasp, a ball and socket or other similar or equivalent type of connector.

A second retention slot 78 is formed circumscribing the housing of the second battery element 62. The slot 78 may be aligned with the port 74 such that the connection cord 76 may be configured to be wrapped around and received within the retention slot 78 when a second proximal connector 79 is affixed within port 74.

Figure 15:
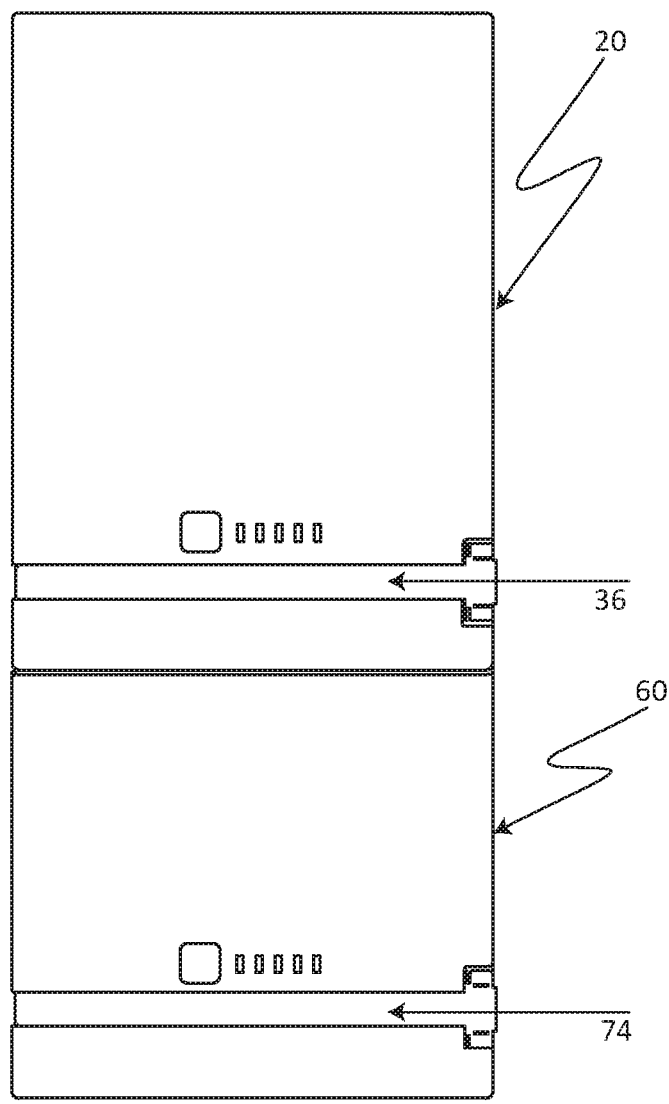
FIG. 15 is a front elevational view of the main first charging element of FIG. 1 connected to the second charging element of FIG. 8.
Figure 16:
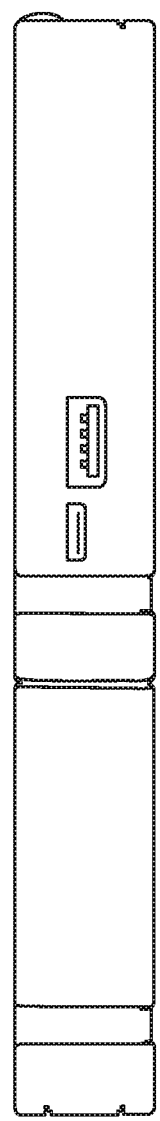
FIG. 16 is a left side elevational view thereof.
Figure 17:
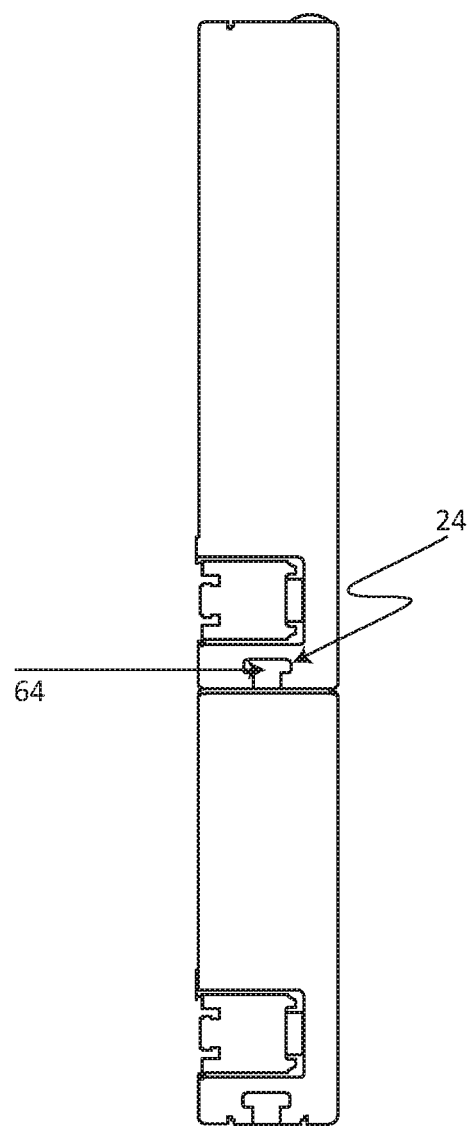
FIG. 17 is a right side elevational view thereof.
Figure 18:
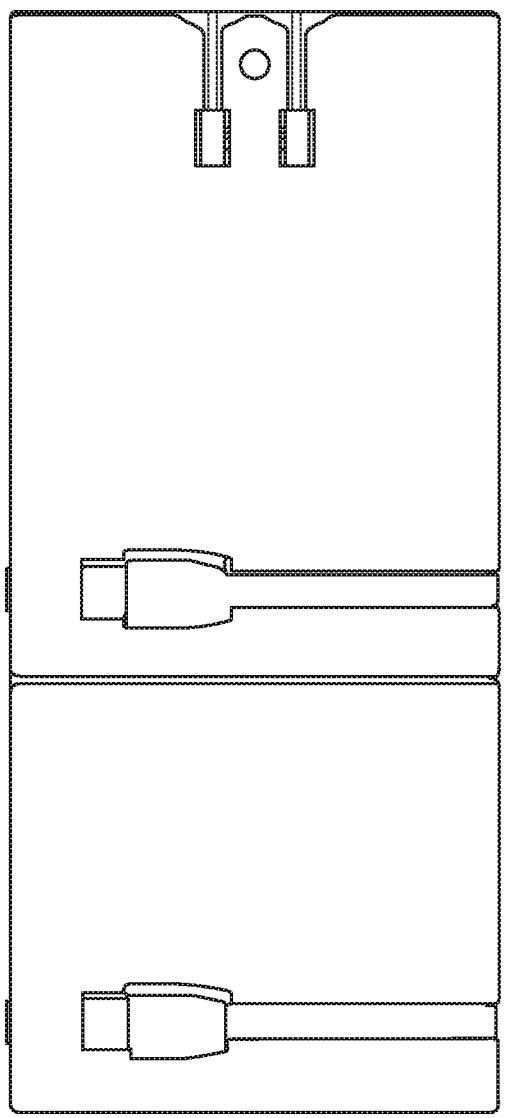
FIG. 18 is a rear elevational view thereof.
Figure 19:
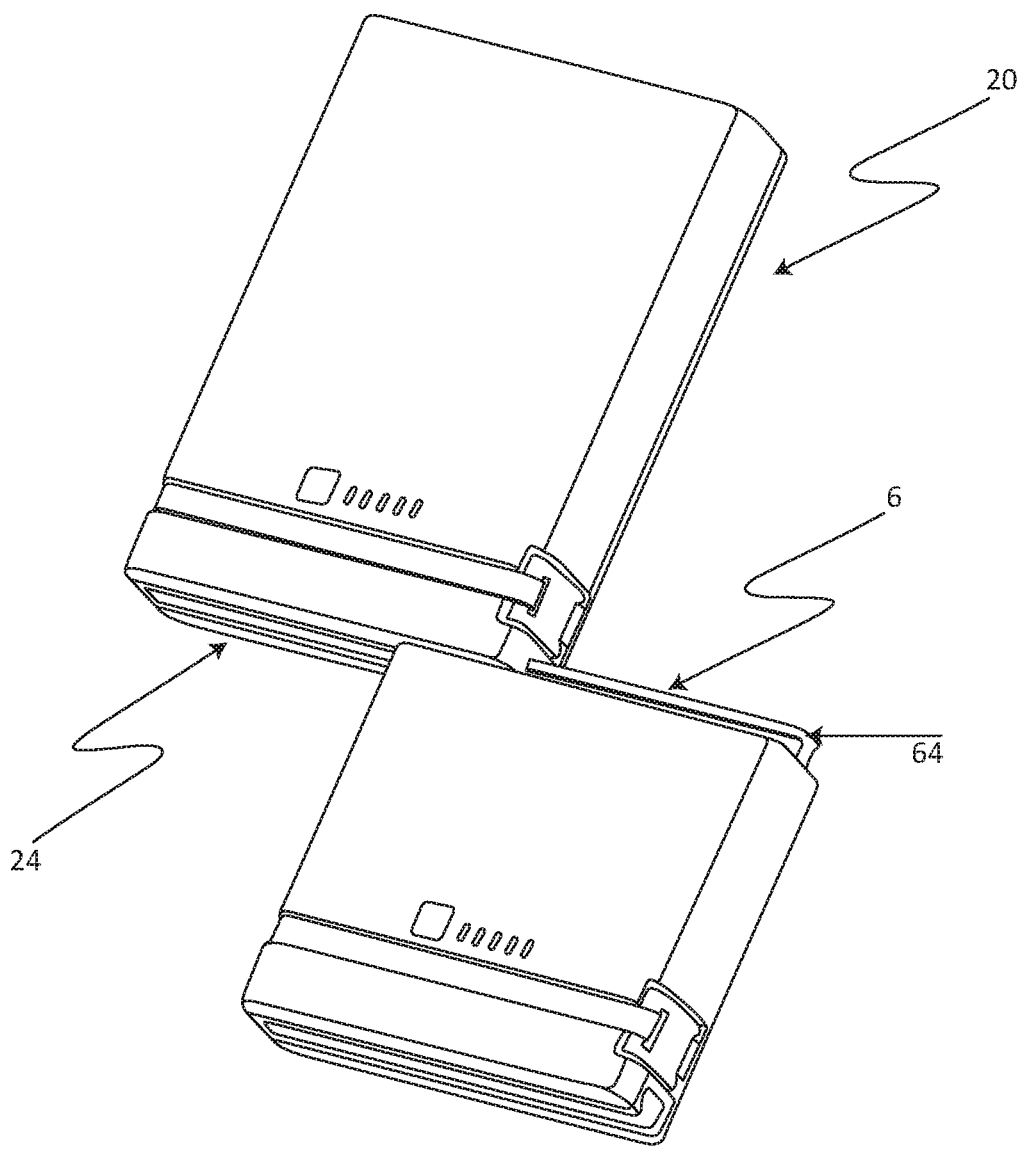
FIG. 19 is a front perspective view thereof, shown therein with the main first element partially affixed to the second element.
Figure 20:
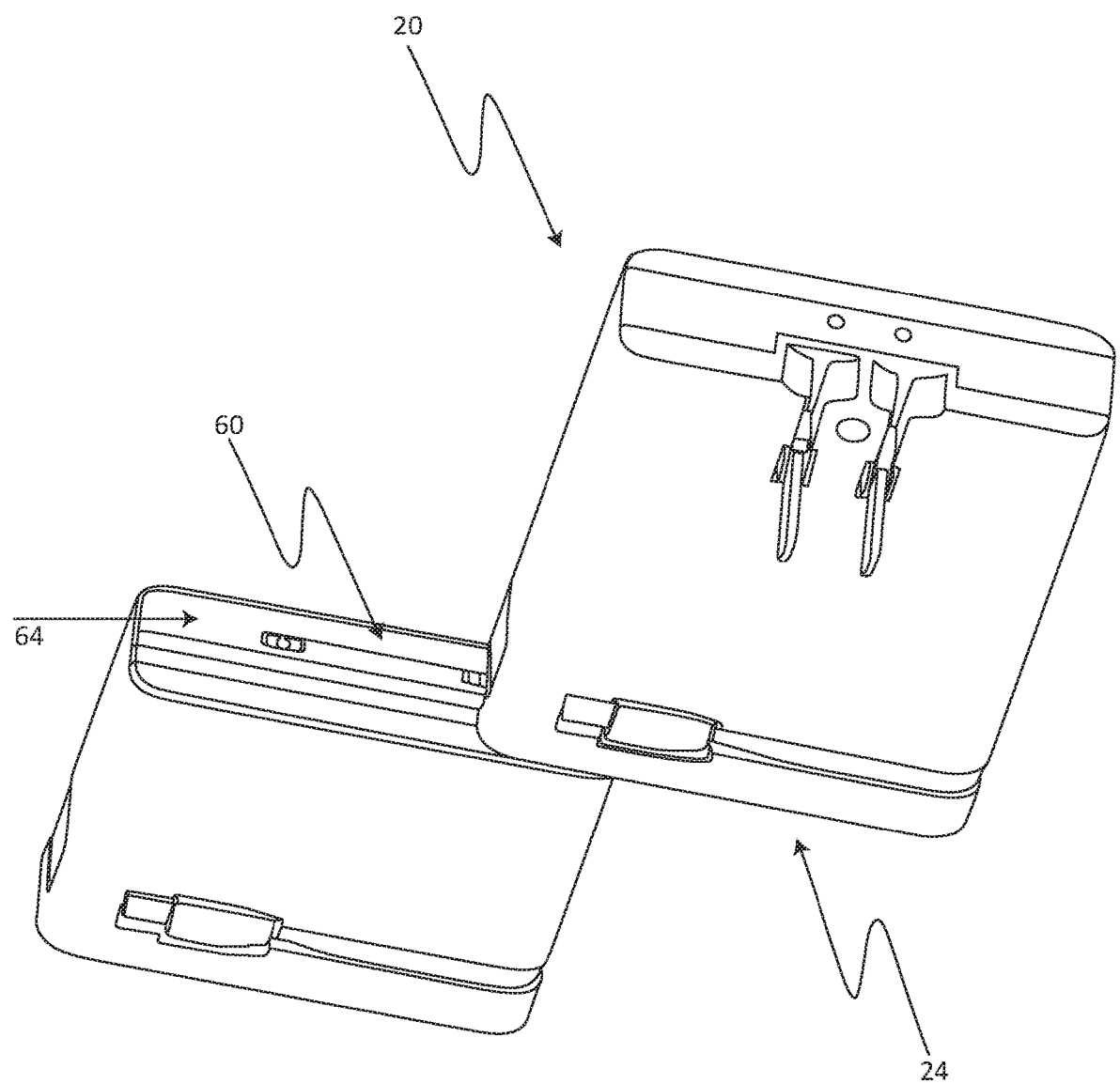
FIG. 20 is a rear perspective view thereof.

Referring now in conjunction with FIG. 15 through FIG. 20, the main first element 20 is shown removably affixed to the second element 60. The female slide connector 24 along the lower terminus of the housing of the first battery element 20 matingly engages with the male slide connector 64 along the upper terminus of the upper terminus of the housing of the second element 60. The matingly engaging slide connectors 24, 64 thereby form an interchangeable tongue and groove connector between the separate elements 20, 60. A positive latching mechanism may be provided between the connected elements 20, 60 to additionally secure the two parts together. In a preferred configuration each slide connector 24, 64 would each include a set of electrical contacts 50 that are preferably positioned to mate when the first element 20 is secured to and aligned with the second element 60. Such engaged contacts permit charging of the second battery element 62 from power derived from the first charging element 22.

Preferably, the internal batteries of either element would Lithium-ion type rechargeable batteries having various capacity ranges. Capacity ranges may be selected from a variety of capacities, include approximately 3,350 mAh, approximately 3,600 mAh, approximately 6,700 mAh, and approximately 13,300 mAh.

The data cables 36, 76 electrically connect between the respective battery element and a portable electronic device. Current portable electronic devices almost universally include a cable connector for power charging or data transmission. Line powered electrical equipment utilize a standard configuration for wall mounted electrical sockets. Such as standard allows for all such devices to be able to connect to any electrical outlet. In contrast, there is no current no single standard configuration to ensure that all cable plugs or connectors can work with various types of devices. Rather, there the two types of data and power cable connectors that currently appear in the market include USB and Lightning.

Universal Serial Bus ("USB") is an industry standard that establishes specifications for cables, connectors and protocols for connection, communication and power supply between personal computers and their peripheral devices. USB was designed to standardize the connection of peripherals like keyboards, pointing devices, digital still and video cameras, printers, portable media players, disk drives and network adapters to personal computers, both to communicate and to supply electric power. It has largely replaced interfaces such as serial ports and parallel ports, and has become commonplace on a wide range of devices. USB connectors also can replace other types of connectors for battery chargers of portable devices.

Lightning is a proprietary computer bus and power connector created by Apple Inc. of Cupertino, Calif. The Lightning connector is used to connect Apple mobile devices like iPhones, iPads, and iPods to host computers, external monitors, cameras, USB battery chargers, and other peripherals.

Given multiple styles of USB connector and widespread use of Lightning connectors, a typical consumer may be required to carry multiple different cables and, possibly, one or more types of adapter to allow compatibility of cables and devices.

The proximal end of each data cable 36, 76 includes a proximal connector of a common type for interchangeably connecting with any of the multiple elements. Such a connect may be with the Qualcomm 3.0 Type-C input/output port 74 usable by any type-C cord. The proximal end of cable may further include a mechanism for locking into the port with a magnetic clasp, a buckle clasp, a ball and socket or other similar or equivalent type of connector The distal end of each data cable includes a distal connector. The proximal and distal connectors may each be a USB standard, USB micro, USB mini, full duplex USB type C, or Lightning form factor.

A key features of the present invention allow for modular, reconfigurable and portable device charging stations adaptable with a variety of customizable cords and plugs. To this end the second element incorporates a second battery element in electrical communication with the first battery element, thereby allowing the charging of multiple portable electronic devices simultaneously, or alternately charging one portable electronic device while recharging one of the battery elements. Further to this end, the female ports at each element provide for connection with different type of cable connector, including a USB A output port, or a type-C output port. Further still, variations of interchangeable cables allow connection between Qualcomm 3.0 type-C input/output ports to any type of device by utilizing a cord having a different selected proximal end configuration.

Numerous and various cords may be provided to be interchangeable, with some at least having different connector configurations. These may include: male Type-C to male USB; male Type-C to Female USB; male Type-C to male AC plug; male Type-C to Male Type-C; male type-C to male Lightning; or male type-C to male micro USB.

Even further still, the use of different configurations of elements may be provided for replacing the second element. Utilizing one or more configurations of third elements, the second element 60 may be replaced by an element similarly configured as the second element and capable of being interchanged with the second element in connection with the first element. A plurality of such third elements may be provided. Further, the battery charging capacity may vary between the various elements.

Various other modular elements may be provided having different configurations and functions that may be connected interchangeably with the main first element. These may include a wireless charging pad, a lighting element (e.g., nightlight, flashlight, etc.), or a DC charger unit allowing any of the other elements to be charged from a car outlet. Various other non-powered accessories may further be used in conjunction with the tongue and groove connection, such as, for example, a support stand attachable to any unit by way of the slide connector to allow the system to stand upright.

Such a modular system allows for multiple charging elements to be connected and charge from a single AC plug. Multiple elements may allow for charging of more than one portable electronic device, or for recharging of any element while recharging any connected element.

2. Operation of the Preferred Embodiment

In operation, the preferred embodiment of the present invention provides a modular, reconfigurable portable device charging power bank is adaptable with a variety of customizable cords and plugs. The main first charging element 20 of the improved multiport portable power bank physically, electrically and operationally coordinates the second charging element 60, or other interchangeable and similarly configured charging elements. Such a configuration and interconnection satisfies a need for a portable charging bank that can recharge or power portable electronic devices without the need for a wall outlet, a car charger, etc. Further, such an improved charging power bank may fulfill a need for such charging in a manner that allows for powering or recharging multiple portable electronic devices, and/or such portable electronic devices using a number of different configurations of cable connectors.

By way of example, and not meant as a limitation, but intended for better understanding of the objects, features, elements and advantages of the present invention, the following Use Cases are herein provided.

Use Case 1

A user traveling with multiple portable electronic devices. The portable device charging power bank is used regularly (e.g., nightly) to charge an Android® work phone and Apple® iPad®. When returning to home, the user connects two of the elements and leaves them connected continuously and plugged into to AC power outlet. When traveling the user takes both elements, and after arriving at a hotel the user detaches the second element and takes to meetings, etc. as a charging device for the Android® work phone. Contemporaneously, the user may leave the main first element plugged into a wall outlet in the his hotel charging the iPad® while away. Upon returning to the hotel in the secondary element is re-attaches to the primary element to recharge both elements at the same time.

Use Case 2

In a multi-member family where every member of the has a smart phone, and many of the members have various types of tablets. Every evening there is a competition to access the available AC wall outlet in the common area of the home (e.g., on the counter in the kitchen). Because of the number of devices, a few additional battery charging elements and charging cords are obtained to ensure sufficient connectivity. Using the main first unit and multiple second units or third units, the family members may all charge all of their devices nightly from the same outlet.

Use Case 3

A family's toddlers (e.g. ages 3-6), having grown up with technology, each use their iPads® constantly and need to charge them every night. They are traveling with their family to theme parks such as, for example, those in Orlando or Anaheim. During a visiting a theme park branded version of a modular base attachment is purchased to support the battery charging elements. Further, a night light attached unit that connects to the main first element is further obtained. Every night as part of their routine for bed, the toddlers each plug their devices into the battery charging elements for overnight charging and while providing nightlight that lights their rooms every night.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Any unintended embracement of such subject matter is hereby disclaimed. They are not intended to be exhaustive nor to limit the invention to precise forms disclosed and, obviously, many modifications and variations are possible in light of the above teaching. By way of example, and not meant to be a limitation, one such modification, variation or addition that envisioned may include a visually discernable means for identifying a level of power charging for each element. Such a visually discernable means may include a glowing LED band that includes multiple different element for identifying levels and/or percentage of charge available. One such configuration of such an indicia may include a number (e.g., separate LED's) that are all different colors, such as 1. Green LED representing 80% to 100% charge;
2. Chartreuse LED representing 60% to 79% charge;
3. Yellow LED representing 40% to 59% charge;
4. Orange LED representing 20% to 39% charge;
5. Red LED representing 0% to 19% charge.

The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by the following claims.

What is claimed is:

1. A portable power bank comprising:
   a main first element comprising:
   a first battery element within a first housing having a first side opposite a second side, said first battery element forming a female slide connector along a lower terminus;
   a deployable AC power input plug in operational electrical power communication with said first battery element;
   a first USB A output port in electrical communication with said first battery element and accessible at said first side;
   a first type-C output port in electrical communication with said first battery element and accessible at said first side; and
   a first inductive wireless power transfer charging input/output port in electrical communication with said first battery element and accessible at said second side;
   a first charging cord having a first proximal end connectable with said first inductive wireless power transfer charging input/output port opposite a first distal end;
   a first retention slot formed circumscribing said first housing, said first slot laterally aligned with the first inductive wireless power transfer charging input/output port such that the first connection cord is received within the retention slot when a first proximal end is affixed within said first inductive wireless power transfer charging input/output port;

a second element comprising:
  a second battery element within a second housing having a third side opposite a fourth side, said second battery element forming a male slide connector along an upper terminus;
  a second USB A output port in electrical communication with said second battery element and accessible at said third side;
  a second type-C output port in electrical communication connection with said second battery element and accessible at said third side; and
  a second inductive wireless power transfer charging input/output port in electrical communication with said second battery element and accessible at said fourth side;

a second charging cord having a third proximal end connectable with said second inductive wireless power transfer charging input/output port opposite a second distal end;

a second retention slot formed circumscribing said second housing, said second slot laterally aligned with the second inductive wireless power transfer charging input/output port such that the first connection cord is received within the retention slot when a first proximal end is affixed within said first inductive wireless power transfer charging input/output port; and said first main first element is removably affixed to the second element by the female slide connector matingly engaging with the male slide connector and thereby form an interchangeable tongue and groove connection.

2. The portable power bank of claim 1, wherein said second battery element is electrically connected to said first battery element when the female slide connector is fully engaging with the male slide connector.

3. The portable power bank of claim 1, further comprising a locking connector at said first proximal end for locking said first proximal end within said first said first inductive wireless power transfer charging input/output port.

4. The portable power bank of claim 3, wherein said locking connector is selected from a group consisting of: a magnetic clasp; a buckle clasp; and a ball and socket connector.

5. The portable power bank of claim 1, wherein said first battery element and said second battery element are Lithium-ion type rechargeable batteries having a capacity range selected from a group consisting of: approximately 3,350 mAh; approximately 3,600 mAh; approximately 6,700 mAh; and approximately 13,300 mAh.

6. The portable power bank of claim 1, wherein said first proximal end and said second proximal end each form a connector selected form a group comprising: a USB standard connector; a USB micro connector; a USB mini connectors; a full duplex USB type C connector; and a Lightning form factor connector.

7. The portable power bank of claim 2, wherein said first proximal end and said second proximal end each form a connector selected form a group comprising: a USB standard connector; a USB micro connector; a USB mini connectors; a full duplex USB type C connector; and a Lightning form factor connector.

8. The portable power bank of claim 5, wherein said first proximal end and said second proximal end each form a connector selected form a group comprising: a USB standard connector; a USB micro connector; a USB mini connectors; a full duplex USB type C connector; and a Lightning form factor connector.

9. The portable power bank of claim 2, wherein said first battery element and said second battery element are Lithium-ion type rechargeable batteries having a capacity range selected from a group consisting of: approximately 3,350 mAh; approximately 3,600 mAh; approximately 6,700 mAh; and approximately 13,300 mAh.

10. The portable power bank of claim 2, wherein said first proximal end and said second proximal end each form a connector selected form a group comprising: a USB standard connector; a USB micro connector; a USB mini connectors; a full duplex USB type C connector; and a Lightning form factor connector.

11. The portable power bank of claim 9, wherein said first proximal end and said second proximal end each form a connector selected form a group comprising: a USB standard connector; a USB micro connector; a USB mini connectors; a full duplex USB type C connector; and a Lightning form factor connector.

12. A portable power bank system comprising:
  the main first element of claim 2; and
  at least two second elements of claim 2, wherein said at least two second elements are interchangeably connectable with the first main element.

13. The portable power bank system of claim 12, further comprising:
  at least a third charging cord having a third proximal end connectable with either said first inductive wireless power transfer charging input/output port or said second inductive wireless power transfer charging input/output port, said third proximal end opposite a third distal end; and
  said third distal form a connector selected form a group comprising: a USB standard connector; a USB micro connector; a USB mini connectors; a full duplex USB type C connector; and a Lightning form factor connector.

14. A portable power bank system comprising:
  the main first element of claim 5; and
  at least two second elements of claim 5, wherein said at least two second elements are interchangeably connectable with the first main element.

15. The portable power bank system of claim 14, further comprising:
  at least a third charging cord having a third proximal end connectable with either said first inductive wireless power transfer charging input/output port or said second inductive wireless power transfer charging input/output port, said third proximal end opposite a third distal end; and
  said third distal form a connector selected form a group comprising: a USB standard connector; a USB micro connector; a USB mini connectors; a full duplex USB type C connector; and a Lightning form factor connector.

16. A portable power bank comprising:
  a main first element comprising:
    a first battery element within a first housing having a first side opposite a second side, said first battery element forming a female slide connector along a lower terminus;
    a deployable AC power input plug in operational electrical power communication with said first battery element;

a plurality of first output ports in electrical power communication with said first battery element;

a second element comprising:

a second battery element within a second housing having a third side opposite a fourth side, said second battery element forming a male slide connector along an upper terminus;

a plurality of second output port in electrical power communication with said second battery element; and said first main first element is removably affixed to the second element by the female slide connector matingly engaging with the male slide connector and thereby form an interchangeable tongue and groove connection that mechanically connects the first main element to the second main element and electrically connects the first battery element to the second battery element.

17. The portable power bank of claim 16, wherein said plurality of first output ports are accessible at said first side or said second side and said plurality of second output ports are accessible at said third side or said fourth side, wherein each said plurality of first output ports and said plurality of said second output ports have a form factor that are each selected from a group consisting of: a USB standard connector; a USB micro connector; a USB mini connectors; a full duplex USB type C connector; and a Lightning form factor connector.

18. A portable power bank system comprising:

the main first element of claim 16; and at least two second elements of claim 16, wherein said at least two second elements are interchangeably connectable with the first main element.

19. A portable power bank system comprising:

the main first element of claim 17; and at least two second elements of claim 17, wherein said at least two second elements are interchangeably connectable with the first main element.

20. The portable power bank of claim 18, wherein said first battery element and said second battery element are Lithium-ion type rechargeable batteries having a capacity range selected from a group consisting of: approximately 3,350 mAh; approximately 3,600 mAh; approximately 6,700 mAh; and approximately 13,300 mAh.

* * * * *